J. S. MARSH.
Plow.
No. 58,855.
Patented Oct. 16. 1866
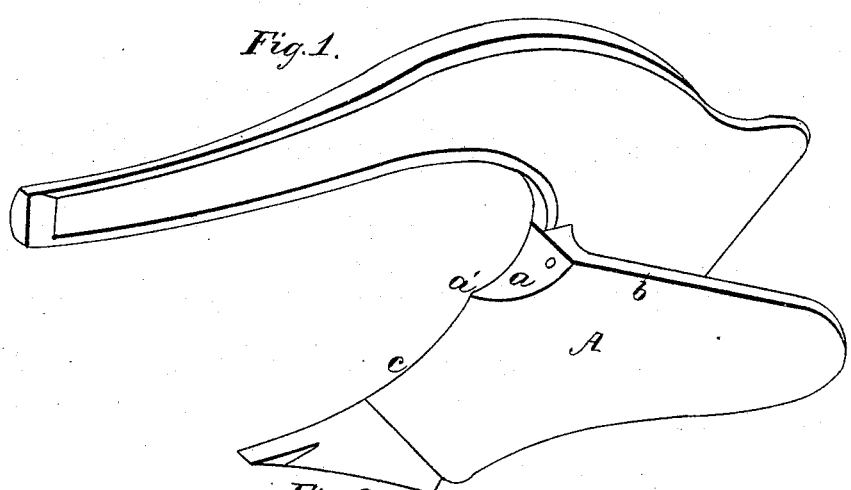
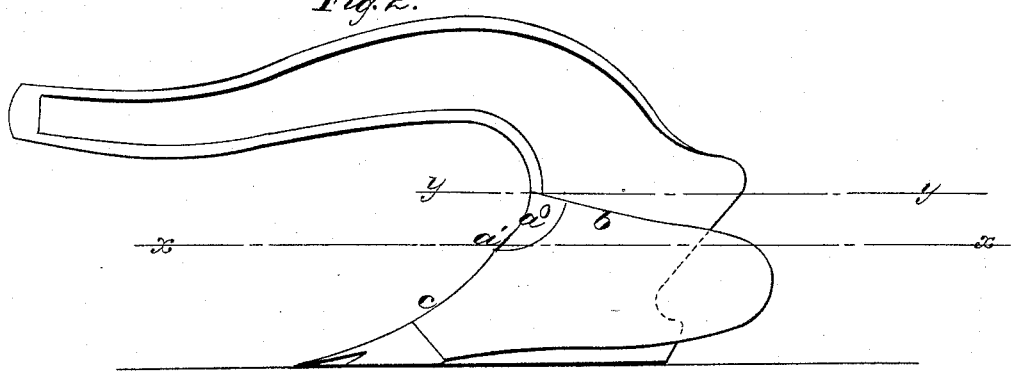
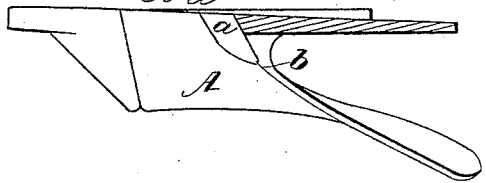
Witnesses:
R. Campbell
Edw Schafer
Inventor;
James S. Marsh
by Atty
Mason Fenwick & Lawrence

UNITED STATES PATENT OFFICE.

JAMES S. MARSH, OF LEWISBURG, PENNSYLVANIA.

IMPROVEMENT IN PLOWS.

Specification forming part of Letters Patent No. 58,855, dated October 16, 1866.

*To all whom it may concern:*

Be it known that I, JAMES S. MARSH, of Lewisburg, in the county of Union and State of Pennsylvania, have invented a new and useful Improvement in Plows; and I do hereby declare that the following is a full, clear, and exact description thereof, reference being had to the accompanying drawings, making a part of this specification, in which—

Figure 1 is a perspective view of a cast-iron plow having my improvement applied to it. Fig. 2 is a side elevation of the plow. Fig. 3 is a horizontal section of the plow, taken at the point indicated in Fig. 2 by red line $y\ y$.

Similar letters of reference indicate corresponding parts in the three figures.

This invention relates to an improvement in the construction of that class of plows which are especially designed for heavy work, and which have their mold-boards and points secured to a cast-iron beam and land-side which are formed of one piece.

The object of my invention is to prevent the accumulation of surface trash and roots about the crotch of such plows, and at the same time to prevent such substances, in any considerable quantity, from falling over the mold-boards into the furrows, and causing the slices to lie uneven, as will be hereinafter described.

To enable others skilled in the art to understand my invention, I will describe its construction and operation.

My invention is especially applicable and useful for those turn-plows which have their land-sides and beams cast in one piece, for the reason that such plows have hitherto been constructed with the lower edge of the beam forming a continuous and unbroken curve with the cutting-edge of the mold-board, thereby forming a crotch, in which surface weeds and grass sods will accumulate, and cause the plow to meet with considerable resistance in its passage through the ground.

To obviate this difficulty colters have been secured to the plows in their crotches for cutting the accumulated obstructions; but it has been found that such cutters fail to clear the plows, and that they require frequent sharpening.

My invention consists in forming a concave depression, $a$, at the termination of the upper part of the mold-board, at the junction of the mold-board A with the curved edge of the standard and beam. This depression is formed in an upper extension, $b$, of the mold-board, which is made sufficiently high above the plane $x\ x$ to prevent the loose grass, roots, and other substances striking the point $a$ from falling over the upper edge of the mold-board into the furrow behind.

The point $a'$ of the cutting-edge of the mold-board A is the highest point of the plow which enters the ground, the plane $x\ x$ representing the surface of the ground.

The concave depression $a$ is so formed in the upper extension, $b$, that its surface is slightly beveled toward the turning-surface of the mold-board, for the purpose of directing the accumulating substances at this point downward, and causing them to be swept over with the turning slice.

By thus forming a concave depression, $a$, above the cutting-edge $c$ of the mold-board there will be a space left between the slice and said depression, for receiving within it the loose surface grass, &c., and allowing this substance to be carried off with the slice.

Should long grass or weeds or roots get astride of the depressed portion $a$, instead of remaining there and offering an obstruction to the plow they will be caught by the turning slices and drawn away.

It will be seen that I do not merely extend the upper portion of the mold-board above the point of turning the slice, but that I form the front portion of this upper extension on a curve, which coincides with the curve of the front or lower edge of the beam, and which intersects the curved cutting-edge of the mold-board at the point $a'$, from which point the slices begin to turn over. This prevents the earth from hugging the surface $a$, and leaves a free space for allowing the plow to clear itself of any obstruction.

Having thus described my invention, what I claim as new, and desire to secure by Letters Patent, is—

Constructing the mold-board of a turn-plow with an upper extension, $b$, having a concave depression, $a$, formed in it above the highest point of entrance into the ground, substantially as described.

JAMES S. MARSH.

Witnesses:
R. V. CAMPBELL,
EDW. SCHAFER.